(12) United States Patent
Hassler et al.

(10) Patent No.: US 8,641,141 B2
(45) Date of Patent: Feb. 4, 2014

(54) VEHICLE SEAT, SCISSORS-TYPE STAND WITH FORCE TRANSMISSION

(75) Inventors: Klaus Hassler, Mehlbach (DE); Rüdiger Nissen, Freisen-Oberkirchen (DE); Thorsten Schweizer, Pirmasens (DE); Thomas Gundall, Queidersbach (DE); Harald Klein, Matzenbach (DE); Thomas Weber, Kaiserslautern (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 583 days.

(21) Appl. No.: 12/527,951

(22) PCT Filed: Jan. 23, 2008

(86) PCT No.: PCT/EP2008/000478
§ 371 (c)(1),
(2), (4) Date: Nov. 25, 2009

(87) PCT Pub. No.: WO2008/101579
PCT Pub. Date: Aug. 28, 2008

(65) Prior Publication Data
US 2010/0140991 A1    Jun. 10, 2010

(30) Foreign Application Priority Data

Feb. 21, 2007 (DE) .......... 10 2007 009 170
Jul. 13, 2007 (DE) .......... 20 2007 009 795

(51) Int. Cl.
*B60N 2/427* (2006.01)
*B60N 2/42* (2006.01)
*B60N 2/16* (2006.01)
*B60N 2/10* (2006.01)

(52) U.S. Cl.
USPC .............. 297/216.19; 297/216.1; 297/344.15

(58) Field of Classification Search
USPC .............. 297/344.12, 344.14, 344.15, 216.1, 297/312, 362, 216.19, 327, 328
See application file for complete search history.

(56) References Cited

U.S. PATENT DOCUMENTS 3,423,785 A * 1/1969 Pickles Joseph ................ 16/325
(Continued)

FOREIGN PATENT DOCUMENTS

DE    28 36 005 A1    2/1980
DE    44 08 219 A1    9/1995
(Continued)

*Primary Examiner* — David Dunn
*Assistant Examiner* — Tania Abraham
(74) *Attorney, Agent, or Firm* — McGlew and Tuttle, P.C.

(57) ABSTRACT

A vehicle seat (1), in particular commercial vehicle seat, is provided with a framework, in particular scissors-type framework (3), a seat frame (10) which is articulated thereon via a pivot axis (B), and a backrest (20) which is attached to the seat frame (10) and by means of which a torque acts about the pivot axis (B) on the seat frame (10) in the event of a crash or misuse. The framework (3) has a first catch element (31) and the seat frame (10) has a second catch element (32) which normally do not interact. In the event of a crash or misuse, the catch elements approach each other and then interact creating a further path for the force flux.

17 Claims, 4 Drawing Sheets

(56) References Cited

U.S. PATENT DOCUMENTS

| | | | | |
|---|---|---|---|---|
| 3,917,211 A | * | 11/1975 | Daunderer et al. | 248/421 |
| 3,977,725 A | | 8/1976 | Tengler et al. | |
| 4,739,959 A | * | 4/1988 | Meiller | 248/393 |
| 4,813,645 A | * | 3/1989 | Iwami | 248/588 |
| 5,251,864 A | * | 10/1993 | Itou | 248/588 |
| 6,030,043 A | | 2/2000 | Habedank | |
| 6,276,650 B1 | | 8/2001 | Kojima et al. | |
| 7,185,867 B2 | * | 3/2007 | Hill et al. | 248/421 |
| 7,712,836 B2 | * | 5/2010 | Deml | 297/344.16 |

FOREIGN PATENT DOCUMENTS

| | | |
|---|---|---|
| DE | 198 28 217 A1 | 7/1999 |
| DE | 199 11 786 | 9/2000 |
| FR | 2 433 433 | 3/1980 |
| GB | 749732 A | 5/1956 |
| JP | 56 131432 | 10/1981 |
| JP | 1-136030 | 9/1989 |
| JP | 9-226427 | 9/1997 |
| RU | 27365 U1 | 1/2003 |
| WO | WO 02/34563 A1 | 5/2002 |

* cited by examiner

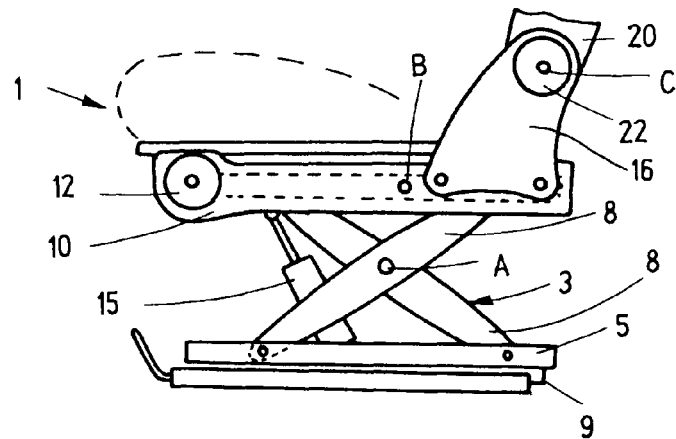
Fig.3
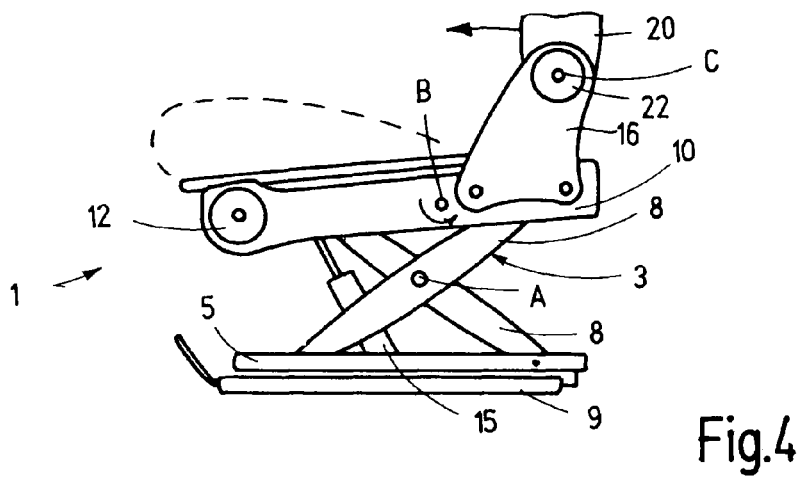
Fig.4
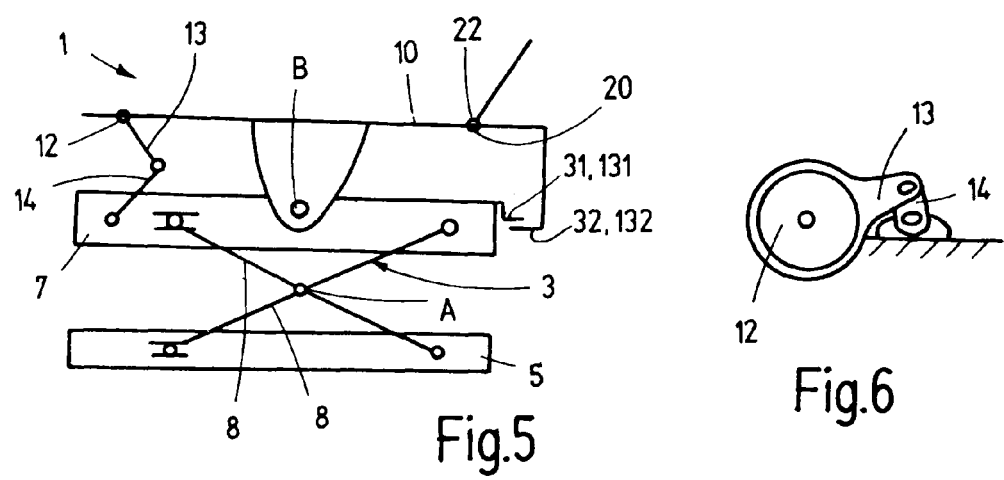
Fig.5
Fig.6

VEHICLE SEAT, SCISSORS-TYPE STAND WITH FORCE TRANSMISSION

CROSS REFERENCE TO RELATED APPLICATIONS

This application is a United States National Phase application of International Application PCT/EP2008/000478 and claims the benefit of priority under 35 U.S.C. §119 of DE 10 2007 009 170.4 filed Feb. 21, 2007 and DE 20 2007 009 795.6 filed Jul. 13, 2007, the entire contents of each of which are incorporated herein by reference.

FIELD OF THE INVENTION

The invention relates to a vehicle seat, in particular commercial vehicle seat, with a stand, in particular a scissors-type stand, a seat frame which is coupled thereto by means of a pivot axis, and a backrest which is attached to the seat frame and, in the event of a crash or misuse, causes a torque to act on the seat frame.

BACKGROUND OF THE INVENTION

Known vehicle seats of this type with a scissors-type stand are generally used for commercial vehicles. While, in a simple embodiment, the seat frame is part of the scissors-type stand or is connected fixedly thereto, in order to increase the seat comfort the seat frame can be adjusted in inclination relative to the scissors-type stand, for example by the seat frame being coupled to the scissors-type stand and a linear adjuster or a gearing pivoting the seat frame relative to the scissors-type stand.

SUMMARY OF THE INVENTION

The invention is based on the object of further improving a vehicle seat of the type mentioned at the beginning.

According to the invention, a vehicle seat is provided, in particular a commercial vehicle seat, with a stand, in particular a scissors-type stand, a seat frame which is coupled thereto by means of a pivot axis, and a backrest which is attached to the seat frame. In the event of a crash or misuse, the backrest causes a torque to act on the seat frame. The stand has a first catch element and the seat frame has a second catch element, which catch elements are normally spaced apart from each other without interaction. In the event of a crash or misuse, the catch elements approach each other and then interact creating a further path for the force flux.

Owing to the fact that the stand has a first catch element and the seat frame has a second catch element, which catch elements are normally spaced apart from each other, in particular are directly adjacent to each other and only slightly spaced apart from each other, without interaction, in particular without contact with each other, and, in the event of a crash or misuse, approach each other and then interact, in particular come into contact with each other, creating a further path for the force flux, the forces are not only conducted via the coupling point of the seat frame to the scissors-type stand and via the linear adjuster or the gearing, but also parallel thereto via the catch elements. Better load transmission from the seat frame to the scissors-type stand and/or the substructure therefore takes place, which permits the components located in the force flux parallel to the catch elements to be smaller and, as a result, as a whole reduces the production costs and the weight. This advantage is preferably reinforced in that the catch elements increase the supporting length by the catch elements being spaced apart from the coupling point, for example at the end of a seat frame, in the case of said seat frame being coupled centrally.

In embodiments which are simple to produce, the catch elements are designed as angled stops, teeth, hooks, bolts, disks, edges of openings or the like.

The catch elements can additionally interact laterally with respect to the main direction of the force flux with each other or with the frames or stands assigned thereto, for example if yielding movements are to be prevented. For this purpose, side-securing means in the form of disks or the like can be provided.

The gearing which pivots the seat frame relative to the scissors-type stand is preferably a lever gearing, for example a triple-jointed element, and preferably has an inclination-adjusting fitting or an equivalent device. The scissors-type stand preferably has a bottom frame, a top frame arranged thereabove and at least one pair of crossed rockers by means of which the top frame can be adjusted in height above the bottom frame. The top frame is that part of the scissors-type stand which interacts with the seat frame, i.e. the seat frame is coupled directly to the top frame, and the linear adjuster or the gearing, which pivot the seat frame, are also coupled thereto or at least supported thereon.

The invention is explained below in more detail with reference to two exemplary embodiments which are illustrated in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a side view which is identical for both exemplary embodiments, the view showing a normal situation at an angle of inclination of 0° between the seat frame and scissors-type stand;

FIG. 4 is a side view corresponding to FIG. 3 showing the structure in the event of a crash;

FIG. 5 is a schematic illustration of the functioning principle, which is identical for both exemplary embodiments;

FIG. 6 is a partial view of the triple-jointed element;

DESCRIPTION OF THE PREFERRED EMBODIMENTS

Figure 1:
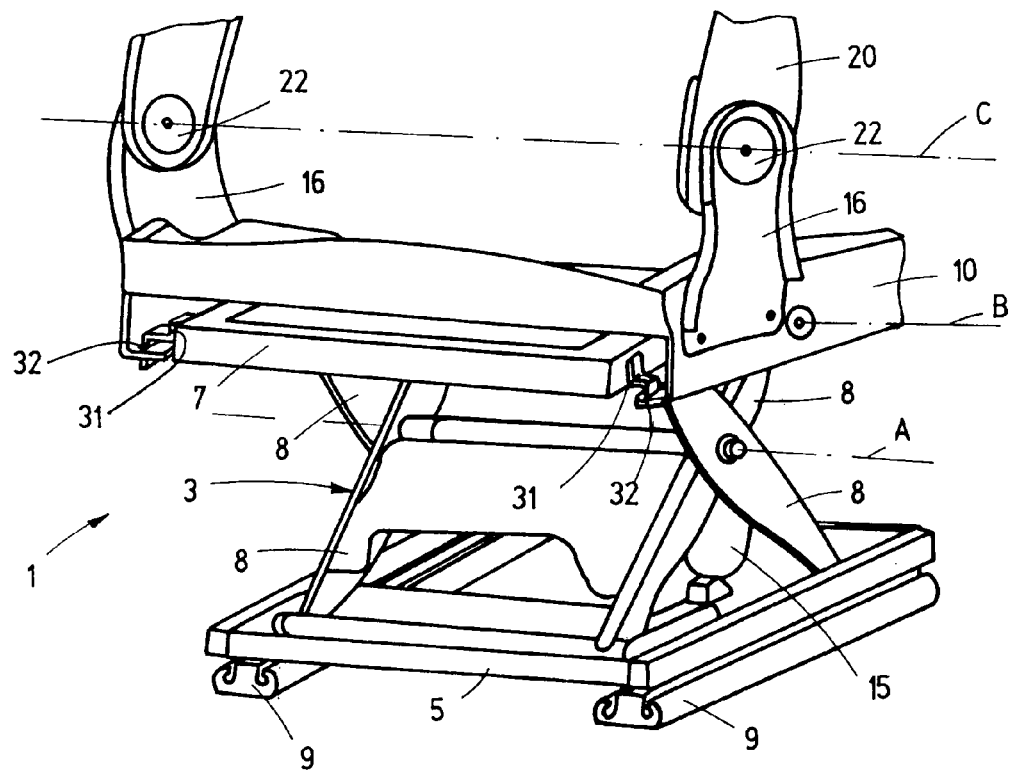
FIG. 1 is a perspective partial view of the first exemplary embodiment without upholstery.
Figure 2:
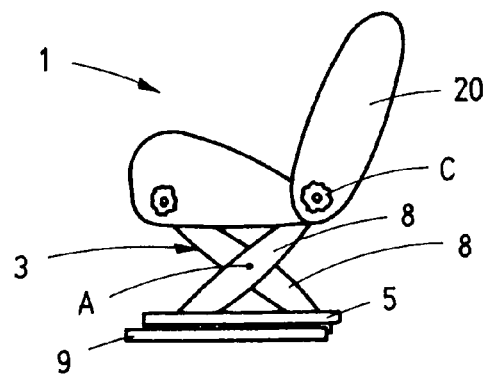
FIG. 2 is a schematic side view which is identical for both exemplary embodiments.
Figure 7A:
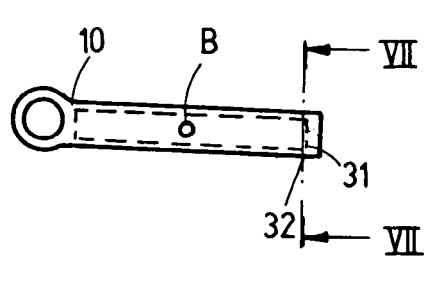
FIG. 7A is a partial view of the first exemplary embodiment at an angle of inclination of 0° between the seat frame and scissors-type stand.
Figure 7B:
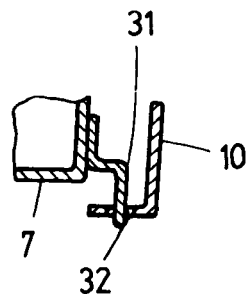
FIG. 7B is a sectional view along the line VII-VII in FIG. 7A.
Figure 8A:
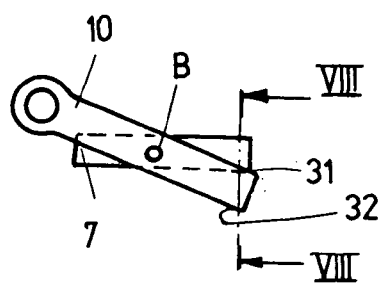
FIG. 8A is a partial view of the first exemplary embodiment with an upwardly inclined seat frame.
Figure 8B:
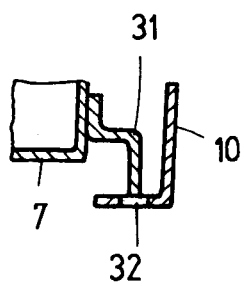
FIG. 8B is a sectional view along the line VIII-VIII in FIG. 8A.
Figure 9A:
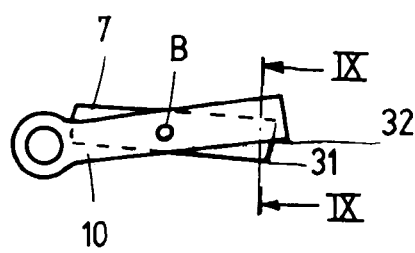
FIG. 9A is a partial view of the first exemplary embodiment with a downwardly inclined seat frame, which occurs in the event of a head-on crash.
Figure 9B:
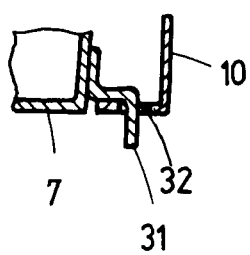
FIG. 9B is a sectional view along the line IX-IX in FIG. 9A.
Figure 10:
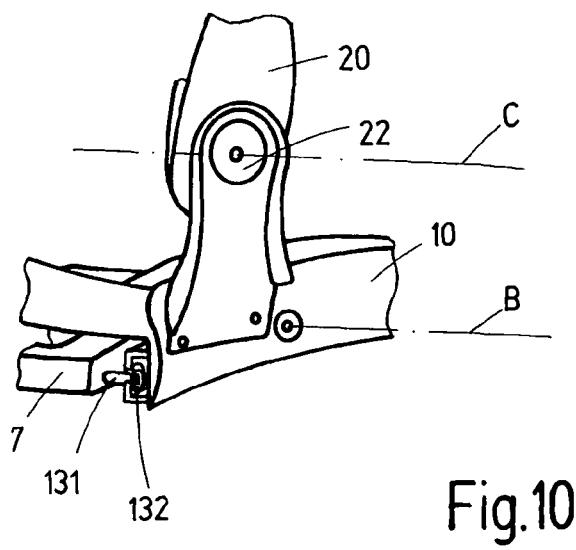
FIG. 10 is a perspective partial view of the second exemplary embodiment, without upholstery, in the region distinguished from FIG. 1.
Figure 11:
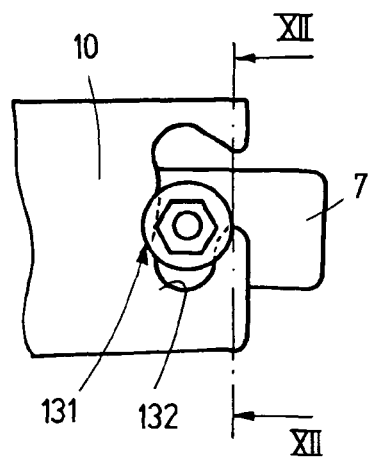
FIG. 11 is a partial view of the second exemplary embodiment at an angle of inclination of 0° between the seat frame and scissors-type stand corresponding to the situation in FIG. 7A.
Figure 12:
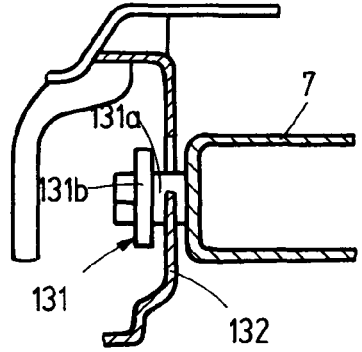
FIG. 12 is a sectional view along the line XII-XII in FIG. 11.
Figure 13:
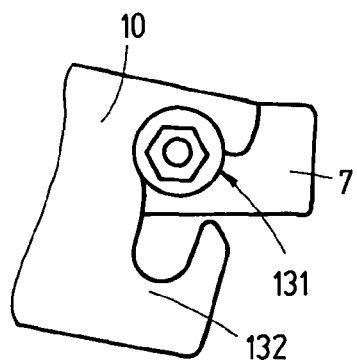
FIG. 13 is a partial view of the second exemplary embodiment with an upwardly inclined seat frame corresponding to the situation in FIG. 8A.
Figure 14:
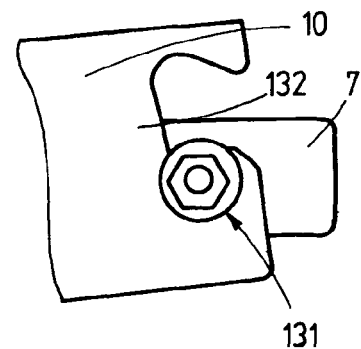
FIG. 14 is a partial view of the second exemplary embodiment with a downwardly inclined seat frame, which occurs in the event of a head-on crash, corresponding to the situation in FIG. 9A.

Referring to the drawings in particular, in both exemplary embodiments, a vehicle seat 1 for a commercial vehicle or another motor vehicle has a scissors-type stand 3 which comprises a bottom frame 5, a top frame 7 arranged thereabove and a respective pair of crossed rockers 8 on both sides. A scissors axis A connects the two crossing points and at the same time defines the axis about which the rockers 8 can pivot relative to each other. The rockers 8 are each coupled at their rear end to the bottom frame 5 and to the top frame 7 and each have, at their front end, rotatable rollers by means of which they are guided movably in the longitudinal direction of the seat in or on the top frame 7 and bottom frame 5. By means of said movement of the rockers 8, the top frame 7 is adjusted in height over the bottom frame 5. In the present case, the scissors-type stand 3 can be displaced in the longitudinal direction of the seat by means of seat rails 9, which are fastened to the bottom frame 5, thus enabling the vehicle seat 1 to be adjusted longitudinally, i.e. enabling the seat longitudinal position thereof to be adjusted.

The vehicle seat 1 furthermore has a seat frame 10 which is coupled on both sides to the top frame 7—pivotably relative to the scissors-type stand 3 about a horizontal seat-frame pivot axis B. In the present case, said seat-frame pivot axis B—as seen in the longitudinal direction of the seat—is arranged somewhat behind the center of the seat frame 10. At the front end of the seat frame 10, an inclination-adjusting fitting 12 is provided at least on one vehicle seat side. On the other vehicle seat side, a joint or a further inclination-adjusting fitting 12 of identical construction is aligned with said inclination-adjusting fitting. The inclination-adjusting fitting 12 has two fitting parts which are rotatable relative to each other and can be locked to each other (latching fitting) or are connected to each other in a geared manner (geared fitting), for example by means of a self-locking eccentric epicyclic gearing. Such inclination-adjusting fittings 12 are known per se for the adjustment of the inclination of the backrest. The inclination-adjusting fitting 12 preferably forms a disk-shaped unit in terms of structure.

One of the two fitting parts of the inclination-adjusting fitting 12 is connected fixedly to the seat frame 10 while a link 14 is coupled at one end to the other fitting part or to a lever 13 which is fixedly connected thereto or is integrally formed thereon. The link 14 is coupled at the other end thereof to the top frame 7. As a result, the inclination-adjusting fitting 12 and the link 14 with its coupling points define a triple-jointed element. If a joint which is aligned with the inclination-adjusting fitting 12 is provided between the seat frame 10 and a lever on the other vehicle seat side, a further link 14 of identical construction is coupled to said lever and to the top frame 7. If a further inclination-adjusting fitting 12 is provided on the other vehicle seat side, the further link 14 is coupled in an identical manner to the inclination-adjusting fitting 12 and to the top frame 7. In both cases, a triple-jointed element is therefore provided on both sides between the seat frame 10 and top frame 7.

The inclination of the seat frame 10 relative to the top frame 7 and therefore relative to the scissors-type stand 3 can be adjusted by means of the inclination-adjusting fitting or the inclination-adjusting fittings 12 and the triple-jointed elements. The seat frame 10 bears a seat shell with a seat cushion in a manner known per se. By means of a spring 15, preferably a gas-filled spring, and preferably a damper, the scissors-type stand 3 is a rockable system which increases the seat comfort.

At the rear end, a respective backrest adaptor 16 is fastened on both sides to the seat frame 10. A backrest 20 is attached pivotably about a backrest pivot axis C to the backrest adaptors 16 by means of backrest fittings 22 provided on both sides. In a modified embodiment, the backrest 20 can be attached pivotably about the backrest pivot axis C directly to the seat frame 10 by means of the backrest fittings 22. In a further modification, a backrest fitting 22 is provided only on one vehicle seat side and a joint is provided on the other vehicle seat side.

Like the inclination-adjusting fittings 12, the backrest fittings 22 can be designed as latching fittings or geared fittings, preferably likewise with a self-locking eccentric epicyclic gearing and, in terms of structure, can preferably likewise form a disk-shaped unit. The backrest 20 can be pivoted relative to the seat frame 10 by means of the backrest fittings 22 and can be adjusted in its inclination. The backrest 20 is upholstered in a manner known per se.

To this extent, the two exemplary embodiments coincide.

In the first exemplary embodiment, a first catch element 31 is provided at the rear end of the top frame 7—in the present case in each case on both vehicle seat sides, said catch element, in the present case, being designed as a catch hook with a double bent portion. At the rear end of the seat frame 10, a respective second catch element 32 is provided for interaction with each first catch element 31 provided. For this purpose, an elongated hole which extends in the longitudinal direction of the seat is formed in the material of the seat frame 10. In the present case, the border region of the seat frame 10, which region borders the elongated hole, in particular the border region on that longitudinal side of the elongated hole which faces the top frame 7, serves as the catch element 32. The catch elements 31 and 32 are spaced apart from the coupling point of the seat frame 10 to the top frame 7. The two catch elements 31 and 32 on each vehicle seat side are arranged spaced apart from each other in such a manner that they normally do not interact. However, meshing or the like is possible. Thus, in the present case, the catch hook as the first catch element 31 can enter the edged elongated hole as the second catch element 32 without the double bent portion bearing against the material of the edge of the elongated hole.

In the second exemplary embodiment, a first catch element 131 is provided at the rear end of the top frame 7—in the present case in each case on both vehicle seat sides. In the present case, the first catch element 131 is designed as a bolt 131a, which protrudes from the top frame 7 parallel to the seat-frame pivot axis B, with a disk, which is screwed onto the end side, as the side-securing means 131b. At the rear end of the seat frame 10, a respective second catch element 132 is provided for interaction with each first catch element 131 provided. For this purpose, an elongated hole is formed in the material of the seat frame 10, said elongated hole extending in a vertical direction and being partially open on the longitudinal side which is at the rear in the longitudinal direction of the seat. In the present case, the border region of the seat frame 10, which region borders the elongated hole, in particular the border region at the lower end of the elongated hole, serves as the catch element 132. The catch elements 131 and 132 are spaced apart from the coupling point of the seat frame 10 to the top frame 7. The two catch elements 131 and 132 on each vehicle seat side are spaced apart from each other in such a manner that they normally do not interact, i.e. neither the bolt 131*a* nor the side-securing means 131*b* makes contact with the seat frame 10. However, the bolt 131*a* protrudes through the elongated hole.

The basic function of the catch elements 31, 32, 131, 132 is the same in both exemplary embodiments. In the event of a head-on crash or severe misuse, when a force acts on the backrest 20 in the forward direction, a forwardly acting torque in the sense of a pivoting movement is caused by means of the backrest 20 to act on the seat frame 10, which is attached to the backrest 20, about the seat-frame pivot axis B. As a result, the seat frame 10, which is coupled to the top frame 7 at the seat-frame pivot axis B, moves downward in direction at its front end and upward at its rear end. As a result, the second catch element 32 or 132 draws closer to the first catch element 31 or 131 and comes—in the present case at approximately 4° downward in relation to the horizontal— into contact with the first catch element 31 or 131, i.e., in the event of a crash or the like, the two catch elements 31 and 32 or 131 and 132 interact, or more precisely in a vertical direction. By means of said interaction and the further path for the force flux, better load transmission from the seat frame 10 to the scissors-type stand 3 takes place.

In the second exemplary embodiment, the first catch element 131 also has an additional function. In the event of a crash, the seat frame 10 may expand along the seat-frame pivot axis B, i.e. its limbs which run in the longitudinal direction of the seat may move apart in said direction. The second catch element 132, i.e. the border region of the seat frame 10, which border region borders the lower end of the elongated hole, then not only comes into contact with the bolt 131*a*, but also comes into contact with the side-securing means 131*b*. The two catch elements 131 and 132 therefore additionally interact laterally with respect to the main direction of the force flux. In the event that the seat frame 10 is compressed along the seat-frame pivot axis B, i.e. its limbs which run in the longitudinal direction of the seat move toward each other in this direction, the second catch element 132 comes into contact with the top frame 7. In both cases, it is ensured that, irrespective of the movement of the seat frame 10, the two catch elements 131 and 132 remain arranged in the vicinity of each other in order to be able to interact.

While specific embodiments of the invention have been described in detail to illustrate the application of the principles of the invention, it will be understood that the invention may be embodied otherwise without departing from such principles.

The invention claimed is:

1. A vehicle seat comprising:
a scissors-type stand comprising a bottom frame, a top frame arranged above said bottom frame and at least one pair of crossed rockers, wherein said top frame is adjustable in height over said bottom frame via said at least one pair of crossed rockers;
a seat frame coupled to the top frame via a pivot axis; and
a backrest attached to the seat frame, in the event of a crash or misuse, the backrest causing a torque to act on the seat frame, the stand having a first catch element and the seat frame having a second catch element, the first catch element and the second catch element being normally spaced apart from each other without interaction and, in the event of a crash or misuse, the first catch element and the second catch element approaching each other and then interacting and creating a path for force transmission from said seat frame to the stand, at least the first catch element comprising a catch hook with a double bent portion, or a bolt, wherein an elongated hole is formed in the material of the seat frame or of the stand, with the border region of the seat frame or of the stand, which border region borders the elongated hole, serving as the second catch element.

2. The vehicle seat as claimed in claim 1, further comprising a linear adjuster or a gearing having an inclination-adjusting fitting wherein the seat frame can be adjusted in its inclination relative to the stand by means of the linear adjuster or the gearing having the inclination-adjusting fitting.

3. The vehicle seat as claimed in claim 1, further comprising at least one triple-jointed element, wherein the seat frame is coupled directly to the stand and is connected in an articulated manner to the stand by means of the at least one triple jointed element.

4. The vehicle seat as claimed in claim 3, further comprising at least one inclination-adjusting fitting wherein the at least one inclination-adjusting fitting is provided in the triple jointed element, said inclination-adjusting fitting being effective between the seat frame or the stand and a link of the triple-jointed element.

5. The vehicle seat as claimed in claim 1, further comprising at least one backrest fitting wherein the backrest is attached pivotably by means of the at least one backrest fitting to the seat frame or to backrest adaptors fastened to the seat frame.

6. The vehicle seat as claimed in claim 5, further comprising at least one inclination-adjusting fitting wherein the inclination-adjusting fitting and/or the backrest fitting form a disk-shaped unit, in terms of structure, and/or in that the inclination-adjusting fitting and/or the backrest fitting is/are designed as a latching fitting or as a geared fitting, with a self-locking eccentric epicyclic gearing.

7. The vehicle seat as claimed in claim 1, wherein, in the event of a crash, the two catch elements additionally interact laterally with respect to the main direction of the force flux.

8. The vehicle seat as claimed in claim 1, wherein, in the event of a crash, at least one of the two catch elements interacts laterally with respect to the main direction of the force flux with the frame or stand assigned to the other catch element.

9. The vehicle seat as claimed in claim 1, wherein at least one of the two catch elements has a side-securing means which is effective laterally with respect to the main direction of the force flux.

10. The vehicle seat as claimed in claim 1, wherein the catch elements are spaced apart from the coupling point of the seat frame to the stand by the pivot axis being provided in the center of the seat frame or in the vicinity of the same in the longitudinal direction of the seat, and the catch elements being provided at the rear end of the seat frame and of the stand.

11. A commercial vehicle seat comprising:
a scissors-type stand;
a seat frame pivotably coupled to the scissors-type stand via a pivot axis; and
a backrest attached to the seat frame, in the event of a crash or misuse, the backrest causing a torque to act on the seat frame, the stand having a first catch element and the seat frame having a second catch element, the first catch element and the second catch element being normally spaced apart from each other without interaction and, in the event of a crash or misuse, the first catch element and the second catch element approaching each other and then interacting and creating a path for force transmission from the seat frame to the stand, wherein a backrest fitting forms a disk-shaped unit and said backrest fitting comprises a latching fitting or a geared fitting with a self-locking eccentric epicyclic gearing, at least said first catch element comprising one of a catch hook with a double bent portion and a bolt, wherein said second catch element comprises an elongated hole formed in said seat frame, said seat frame comprising a border region, said border region defining said elongated hole.

12. The vehicle seat as claimed in claim 11, further comprising a linear adjuster or a gearing having an inclination-adjusting fitting wherein the seat frame is adjusted in an inclination relative to the stand via the linear adjuster or the gearing having the inclination-adjusting fitting.

13. The vehicle seat as claimed in claim 12, further comprising at least one triple-jointed element, wherein the seat frame is coupled directly to the stand and is connected in an articulated manner to the stand by means of the at least one triple jointed element.

14. The vehicle seat as claimed in claim 13, wherein the at least one inclination-adjusting fitting is provided in the triple-jointed element, said inclination-adjusting fitting being effective between the seat frame or the stand and a link of the triple-jointed element.

15. The vehicle seat as claimed in claim 14, wherein the backrest is attached pivotably by means of at least one said backrest fitting to the seat frame or to backrest adaptors fastened to the seat frame.

16. The vehicle seat as claimed in claim 15, wherein the inclination-adjusting fitting forms a disk-shaped unit and/or the inclination-adjusting fitting comprises a latching fitting or a geared fitting with a self-locking eccentric epicyclic gearing.

17. The vehicle seat as claimed in claim 11, wherein the scissors-type stand has a bottom frame, a top frame arranged thereabove and at least one pair of crossed rockers by means of which the top frame can be adjusted in height over the bottom frame.

* * * * *